Jan. 29, 1952  J. H. SCHLOEN ET AL  2,583,799
ELECTROLYTIC PROCESS OF PREPARING SELENIC
ACID FROM SELENIOUS ACID
Filed May 24, 1949

INVENTORS
John H. Schloen
BY Luigi V. Franchetto

Robert S. Dunham
ATTORNEY

Patented Jan. 29, 1952

2,583,799

UNITED STATES PATENT OFFICE 2,583,799

ELECTROLYTIC PROCESS OF PREPARING SELENIC ACID FROM SELENIOUS ACID

John H. Schloen and Luigi V. Franchetto, Montreal, Quebec, Canada, assignors to Canadian Copper Refiners Limited, Montreal, Quebec, Canada, a corporation of Canada Application May 24, 1949, Serial No. 94,992

6 Claims. (Cl. 204—101)

Our present invention relates to a practical and commercially practicable electrolytic process of preparing selenic acid from selenious acid.

Selenic acid has been prepared in the past by two principal methods, viz. chemical methods and electrolytic methods. Both these methods as heretofore carried on have involved substantial difficulties and undesirable characteristics and neither has been wholly satisfactory from a commercial point of view. As an example of prior art chemical methods, selenium dioxide, which may be dissolved in water to form selenious acid, can be converted to selenic acid by the use of an oxidizing agent, such as hydrogen peroxide according to the equation

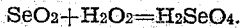

$$SeO_2 + H_2O_2 = H_2SeO_4.$$

In carrying on such an oxidation reaction much of the available oxygen from commercial 30% peroxide is lost during the reaction and only a partial (25% to 30%) conversion of selenic acid is obtained when chemically equivalent amounts of selenium dioxide and hydrogen peroxide are used. If a very large excess of 30% peroxide is used and an extended refluxing time provided, there still results only about a 90% conversion. This type of operation is considered commercially unsatisfactory, by comparison with the present process at least, as hereinafter set forth.

If 90% hydrogen peroxide be used in place of 30% peroxide, there is a more vigorous reaction, but no more effective conversion of the selenious acid to the desired selenic acid. In one such test 40 times the theoretical quantity of 90% peroxide resulted in a conversion to selenic acid of only about 75% of the selenious acid.

Other chemical methods of preparing selenic acid are known, including the oxidation of selenium dioxide with chloric acid and the oxidation of silver selenite with a halogen such as chlorine, bromine or iodine. These methods are very expensive due to high unit cost and poor utilization of the oxidants.

Attempts have also been made to prepare selenic acid from selenious acid by electrolysis. In such attempts it has been found that if sufficient nitric acid be present, the deposition of selenium can be to a large extent prevented. One such attempt used an anode current density of about 4 to 5 amperes per square centimeter and a somewhat smaller cathode current density. The electrode material was not specified, but presumably would have to be platinum or some other chemically inert material because of the presence of nitric acid in the electrolyte.

Selenious acid can be oxidized electrolytically to selenic acid without the addition of nitric acid to the electrolyte; but in this case only two-thirds of the selenious acid is oxidized at the anode. The remaining third is reduced to elemental selenium at the cathode regardless of the cathode current density employed; and in addition to this, in such an electrolytic operation, a side reaction proceeds at the cathode surface, resulting in the formation of hydrogen selenide, which is an extremely toxic and therefore highly objectionable gas. The presence or evolution of this gas necessitates very careful operation and also involves a loss of selenium.

The prior art has also disclosed an electrolytic method of oxidizing selenious to selenic acid using a permeable non-conducting diaphragm to separate the anolyte from the catholyte. In such a process the anolyte was selenious acid and the catholyte, 5-normal nitric acid. The anodes were platinum or lead foil and the cathode was platinum. When this process was carried out with platinum electrodes, a yield of 81% of the selenium introduced into the cell was obtained as selenic acid, the remainder being in the diaphragm. Lead electrodes gave a 66% yield, selenium being lost as PbSeO₄ in the anode slime and as selenium in the catholyte. The current efficiencies were extremely low, the highest (35.2%) being obtained with lead electrodes. It was found impossible to prevent diffusion of the electrolytes even when a diaphragm of very low permeability was employed. When nitric acid was used as the catholyte, it diffused into the anolyte causing severe corrosion of the lead anodes used in such an operation. When platinum or platinum clad metal was used for electrodes, the cost of the cell construction was prohibitively high for commercial operation.

A principal object of the present invention is to provide an electrolytic process of preparing selenic acid from selenious acid in an electrochemical cell, which is economically practicable for commercial operation, both from the point of view of the initial cost of the cell and from the point of view of the operation thereof as affected by current efficiency. As such, the cell, in accordance with the present invention, is contemplated to be one using electrodes of lead, or lead alloys which are predominantly of lead, and using electrolytes which contain substantially nothing except one or more of the acids of selenium. We have found that it is possible to carry out such a process without substantial loss of selenium by reduction to the form of elemenal selenium and without substantially any evolution of the noxious hydrogen selenide, by supplying to the cathode chamber during the electrolysis an aqueous solution of hydrogen peroxide and by certain other detailed refinements of operation hereinafter more particularly set forth.

The present invention may be summarized, therefore, as a process for the electrolytic production of selenic acid from selenious acid in a diaphragm type electrolytic cell, having electrodes which are preferably lead or lead alloys which behave under the conditions present in a manner equivalent to lead, but which electrodes may also be formed of certain other materials as hereinafter set forth in greater detail, wherein the catholyte is substantially pure selenic acid in aqueous solution, and wherein the anolyte is initially a mixture of selenious and selenic acids and is progressively converted to selenic acid as the electrolysis proceeds. In accordance with the present invention an aqueous solution of hydrogen peroxide is supplied to the bottom portion of the cathode chamber, resulting in the substantially total elimination of the production of hydrogen selenide and resulting in a practical minimizing of the reduction of selenium to the form of elemental selenium at the cathode. The current densities in accordance with the present invention are about 3 to about 12 amperes per square foot at the anode and about 10 to about 40 amperes per square foot at the cathode. In such an operation over 99% of the selenious acid may be efficiently converted to selenic acid and with a very high current efficiency, over 80% in some tests. Due to the continuous introduction of an aqueous solution into the cathode chamber, provision is made for controlling the liquid level in this chamber and for passing the overflow therefrom to the anode chamber. Due to the character and chemical composition of the catholyte, it does not cause any undesired effect when added to the anolyte. The anolyte is also maintained at a predetermined liquid level by providing a simple overflow means, and the liquid overflowing used either for the recovery of selenic acid or for providing a charge for a subsequent operation, or both, in accordance with the desires of the operators.

While many different types of cells could be used for carrying on the process of the present invention, there is shown in the accompanying drawings one type which has been found quite efficient in use.

Figure 1:
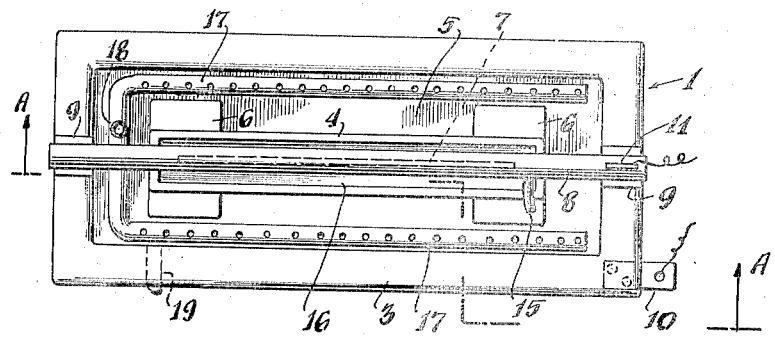
Figure 1 is a view substantially in plan of a cell in which the process of the present invention may be carried out.
Figure 2:
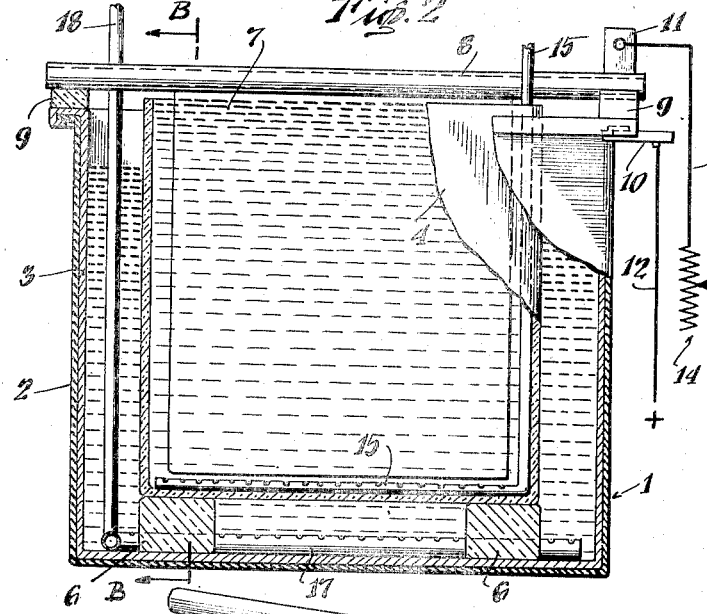
Fig. 2 is a view partly in elevation and partly in vertical section substantially on the line A—A of Fig. 1.
Figure 3:
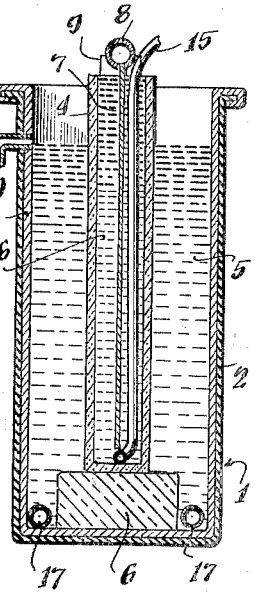
Fig. 3 is a transverse view substantially in vertical section on the line B—B of Fig. 2.
Figure 4:
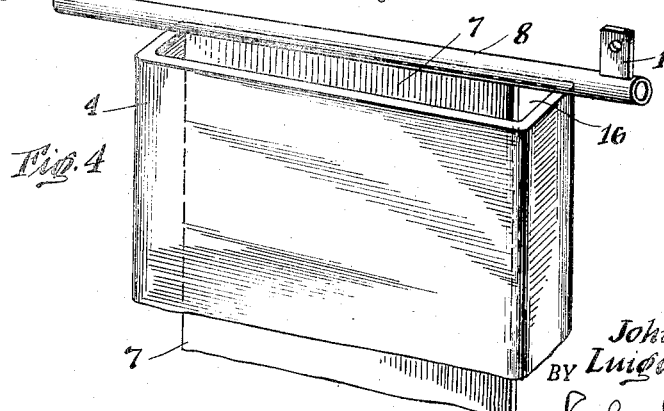
Fig. 4 is a fragmentary view in perspective illustrating the cathode and support therefor and a portion of the diaphragm defining the cathode chamber.

Considering first the cell shown in the accompanying drawings, there is provided a cell construction 1, which may be formed of a housing or shell 2 of any suitable material provided to give the necessary mechanical strength and support. Within the shell 2 is a cell-lining 3, which in the present instance is used as an anode, this lining being of desired electrically conducting material as hereinafter set forth in discussing the anode construction. As shown, the cell is made up as a substantially rectangular type container of any desired proportions, for example as a relatively thin box-like structure, more or less square as shown in side elevation and relatively narrow in end elevation. Such a shape lends itself in a desired manner to the use of a sheet metal type cathode. Within the construction including the parts 2 and 3 is a porous diaphragm 4 formed as a box-like container similar in shape to, but smaller than, the outer cell construction so as to provide between it and the anode or cell lining 3 an anode chamber 5 of substantial size, particularly as compared to the volume of the cathode chamber, which is that space within the box-like diaphragm 4. The diaphragm 4 may be of any suitable porous, electrically non-conducting material, such as Alundum. This box-like diaphragm 4 may be suitably supported from the bottom of the cell upon any desired type supporting means of electrically on-conducting material such, for example, as glass blocks shown at 6. Depending within the cathode chamber in the diaphragm 4 is a plate-like cathode 7 formed of any suitable electrically conducting material as hereinafter set forth in discussing cathode material. The material for both the anode and the cathode in accordance with the present invention is preferably lead or an alloy of lead which will behave under the conditions present in a manner equivalent to lead. In the present instance the cathode 7 is supported from a transverse hollow metallic structural member 8, which is in turn carried by a pair of insulating supports 9. Suitably attached to the cell lining 3 and the member 8 are a pair of tabs 10 and 11 respectively, these tabs being of electrically conducting material and electrically connected to the anode and cathode respectively. Suitable electric current conductors are connected as indicated by the leads 12 and 13 to the tabs 10 and 11 respectively, a rheostat or other current regulating means generally indicated at 14 being provided for controlling current flow through the cell. In this way and by the design of the electrodes as to the surface area thereof in contact with the anolyte and catholyte respectively, the current densities at the anode and cathode may be suitably predetermined to provide the desired values for these factors as hereinafter set forth.

Within the cathode compartment, i. e. within the box-like diaphragm 4, is a means for supplying to the cathode chamber a suitable liquid, which in the present instance is an aqueous solution of hydrogen peroxide. Such means may comprise a suitable tube 15, which may be a flexible lead tube, for example, and which preferably extends to the bottom of the cathode chamber 16 and thence along such chamber, being provided with suitable perforations for the progressive and more or less uniform discharge of the peroxide solution into the cathode chamber along the bottom thereof where it may mix with the catholyte and have the desired chemical effect as hereinafter described.

Associated with the anode chamber 5 is preferably a means for effecting desired agitation of the anolyte. In the present instance, such means comprises a perforated tube 17 which may be formed in U-shape as shown and may be supplied with an agitating gas such as air through a supply pipe 18 leading from a suitable source of such gas under appropriate pressure.

As will be noted in the accompanying drawing, the box-like diaphragm 4 defining the cathode chamber 16 extends a substantial distance upwardly beyond the level shown for the anolyte in the anode chamber 5. Thus when liquid is continuously supplied to the cathode chamber (as through the tube 15) during the electrolysis, the catholyte may overflow to any necessary extent into the anode chamber, the maximum level in the cathode chamber thus being that of the upper edge of the diaphragm 4 and the catholyte running down over the edge into the anode chamber to mix with the anolyte therein. The anolyte is also maintained at a predetermined level by providing a suitable overflow connection as diagrammatically illustrated at 19, through which anolyte may flow when the level tends to rise above the level of the overflow passage. This overflow liquid may be collected in a manner not illustrated, but which will be obvious to those skilled in the art from this description, and used in any of the ways hereinafter taught.

*Electrode material*

Considering now the characteristics of the anode and cathode required in order that the process may be practically operative, it is of course necessary that these electrodes be of electrically conducting material having sufficient mechanical strength to permit them to be built up and have a reasonable life in a cell, which may be used commercially in the practice of the present process. Other requirements have to do with the chemical and electro-chemical actions taking place in the cell.

Considering first the anode material, which is the more critical of the two electrodes, as it is in the anode compartment that the desired oxidation must take place, it is found that lead, or an alloy consisting essentially and predominantly of lead and which behaves under the conditions present in a manner equivalent to lead, is the preferred material for construction of the anode, which in the present instance is preferably formed as a sheet metal lining 3 for the housing or shell 2. It has also been found that carbon, including not only pressed carbon such as is often used as electrode material, but also graphite, may be used as the anode material. This material is, of course, not as highly resistant against abrasive wear and other mechanical disintegration as is a metal; but loose carbonaceous material separated by disintegration from a carbon electrode may be separated from the electrolytes by simple filtration, so that such partial disintegration does not represent a prohibitive factor. The process may also be carried on in a cell having a platinum anode. Practically, however, this is not desired for the obvious reason of the high cost of such a cell construction. It is, however, completely satisfactory from a chemical and electro-chemical point of view. No other materials are now contemplated for use as anode materials. The following materials have been tested and found undesirable: chromium plated copper, copper, stainless steel, tin, iron, zinc, nickel, aluminum (type AC-2S), aluminum alloy (type AC-57S), magnesium alloy (type FS-1A), silver and titanium. The alloy "AC-2S" has the following composition:

| | Per cent |
|---|---|
| Cu | 0.2 |
| Fe+Si max | 1.0 |
| Mn | 0.1 |
| Zn | 0.1 |
| Total other impurities | 0.15 |
| Balance aluminum. | |

The alloy "AC-57S" has the following composition:

| | Per cent |
|---|---|
| Cu | 0.1 |
| Fe+Si max | 0.45 |
| Mn | 0.1 |
| Zn | 0.1 |
| Total other impurities | 0.15 |
| Mg | 2.2–2.8 |
| Cr | 0.15–0.35 |
| Balance aluminum. | |

The alloy "FS-1A" has the following composition:

| | Per cent |
|---|---|
| Al | 3.0 |
| Mn | 0.3 |
| Zn | 1.0 |
| Balance magnesium. | |

The cathode material for use in the present process is not quite as critical as that of the anode. It has been found, for example, that all the materials hereinabove described as suitable for anodes may be used for cathodes. In addition to this the following materials have been tried and found operative as cathodes: tin, titanium, zinc and nickel. When operating a cell with zinc or nickel cathodes, however, it has been found that such cathodes should be allowed to stand in the cell electrolyte only when current is on, as otherwise they will be attacked by the catholyte (selenic acid in aqueous solution). The following materials have been tried and found to be unsatisfactory as cathodes: chromium plated copper, copper, stainless steel, iron, aluminum (type AC-2S containing a minimum of 90% aluminum), aluminum alloy (type AC-57S), magnesium alloy (type FS-1A), and silver.

It is believed that any base material other than those particularly listed hereinabove and electrolytically plated with some other metal, would not be suitable as electrode material even though the other plating material be itself in the preferred list, due to unavoidable pin holes in the plating. Gold is believed to be suitable for both anode and cathode material, although this metal has not been tried as such. Practically it is not desired to use gold by reason of the cost thereof as hereinabove set forth as to platinum.

We prefer, however, to use lead, or an alloy consisting essentially and predominantly of lead and which behaves under the conditions present in a manner equivalent to lead, as both anode and cathode due to the completely satisfactory chemical and electro-chemical action of such materials and also due to the relatively low cost as compared with other chemically and electro-chemically operative materials.

*Electrolyte compositions*

In accordance with our present invention it is desired that the electrolytes on both sides of the porous diaphragm be aqueous solutions of one or more selenium-containing acids, so that even though there may be a mixing of the electrolytes as hereinafter set forth, no undesired results will ensue. Furthermore, it is specifically desired to avoid the use of such concentrated acids such as nitric acid as was used in certain prior art processes and which in practice precludes the use of lead electrodes in contact therewith.

The catholyte in the present case need only be provided with sufficient of a selenium-containing acid to have a desired electrical conductivity.

As such, therefore, the concentration is not particularly critical. It has been found, for example, that aqueous solutions of selenic acid from about 5% to about 50% are practically operative, with the preferred range from about 15% to about 35%, all percentages given being by weight. Selenic acid is in many respects similar to sulphuric acid and is soluble in water in all concentrations. As such, therefore, it serves to reduce the electrical resistance and increase the conductivity of the catholyte while providing an aqueous solution which, when mixed with the anolyte, will not introduce any undesired material thereto. There is practically no single critical concentration for the catholyte. In initially starting an operation in accordance with the present invention, selenic acid produced in any way known to the art, and/or obtained commercially from any available source, may be employed.

The catholyte may contain one or more other materials in addition to selenic acid, but if so, such other materials must be such as not to have any chemical or electro-chemical reaction which will interfere with the desired operations contemplated in the cell in accordance with the present invention. Practically, however, the catholyte consists solely of an aqueous solution of selenic acid, with merely traces of any other materials, which may be inadvertently introduced as impurities.

The anolyte also preferably contains sufficient of a material which will not be undesired in view of the process to be carried on, but which will increase the conductivity or decrease the electrical resistance of the anolyte to a desired extent. Such a material again is selenic acid. This material is used in the anolyte solely for the purpose of providing a desired electrical conductivity therefor. In addition to this, the essential and desired ingredient in the anolyte as introduced into the cell is selenious acid, which is the raw material to be oxidized to form selenic acid. This material may be introduced as solid selenium dioxide and dissolved in the water which is used to make up the desired anolyte composition.

In order to get the desired electrical resistance-conductivity characteristics, the initial concentration of selenic acid in the anolyte is preferably from about 15% to 25% by weight. The selenious acid concentration in the anolyte may be from zero to about 25% by weight, and preferably is about 15% to about 25%. It will be understood that as the electrolysis proceeds, the concentration of selenious acid in the anolyte is progressively reduced and the concentration of selenic acid correspondingly increased. Thus any concentration of selenious acid which may initially be present will be reduced in the direction of zero as the electrolysis proceeds.

The operation of the process

From a chemical and electro-chemical point of view, the desired reactions to be carried on in the cell are as follows:

Anode compartment

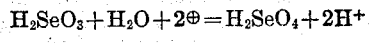
$$H_2SeO_3 + H_2O + 2\ominus = H_2SeO_4 + 2H^+$$

Cathode compartment

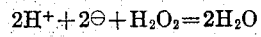
$$2H^+ + 2\ominus + H_2O_2 = 2H_2O$$

From these equations it will be seen that it is necessary, in accordance with the desired process of the present invention, to supply hydrogen peroxide to the cathode compartment. This may be done as set forth in describing the apparatus shown in the accompanying drawings by supplying an aqueous solution of hydrogen peroxide to the lower part of the cathode compartment 16 through the pipe or tube 15. Practically it has been found that a 30% aqueous solution of hydrogen peroxide supplied in this way will effect the desired results. The desired results, of course, are the carrying out of the reaction as expressed in the equation above for the cathode compartment. The peroxide is effective practically to prevent the formation and evolution of hydrogen selenide ($H_2Se$). As such, it is feasible in practice to have workmen in a room with the cells in accordance with the present invention in operation without providing such workmen with gas masks and without danger of poisoning them or subjecting them to such noxious gases as to make the work highly unpleasant, if not wholly prohibitive. By preventing the formation of hydrogen selenide, loss of selenium in this way is also prevented.

Another practical result of the use of hydrogen peroxide is in minimizing the amount of selenium reduced to an elemental state at the cathode. While it is of course possible to separate elemental selenium which may be thus deposited and convert it again into selenium dioxide for use as a starting material for the present process, such steps, where necessary or used, represent a practical loss in commercial operation, due to the necessity for reprocessing a substantial amount of selenium and a corresponding loss in efficiency of the process. It has been found in practice that the introduction of hydrogen peroxide as aforesaid results in the effective minimizing of selenium reduction.

Current densities

While the anode current density may be from about 3 to about 12 amperes per square foot, a value of about 5 amperes per square foot is preferred. The cathode current density may be varied between about 10 and about 40 amperes per square foot, with a value of about 15 preferred for this factor.

Examples (1) *Cell construction.*—While many types of cells may be considered operative in accordance with the present invention, we have had considerable success with a cell constructed substantially as shown in the accompanying drawings having an Alundum diaphragm 24"x 24"x 3" in outside dimensions with a ¼" wall thickness throughout. This cell had an anolyte compartment having capacity of 112 liters when filled to a depth of 24". The catholyte compartment capacity was 24 liters. This cell used electrodes which were both of lead.

(2) *Operation.*

*Example 1.*—Using a cell as above set forth, and with catholyte concentration and volume as and within the limits stated, the anolyte was prepared by filling the anolyte compartment about half full with 35% selenic acid, then about 60 pounds of selenium dioxide was charged into the anolyte compartment and the volume made up with water to 112 liters. The starting anolyte contained 253.8 grams $H_2SeO_3$ per liter. Electrolysis was carried on with a total current of 100 amperes applied through the cell. During the test the potential drop across the cell was about 2 volts. The cathode and anode current densities were respectively 18.2 and 5.9 amperes per square foot. The temperature in the cell ranged from about 85 to about 100° F. At the end of 161½ hours analysis of the anolyte indicated the presence of only 0.051% selenious acid. At this time the oxidation was considered complete. The anolyte at the end of the electrolysis contained 0.65 gram $H_2SeO_3$ per liter. This represented a conversion of 99.74%. During this period a total of 130 lbs. of 30% hydrogen peroxide was added continuously and progressively to the catholyte. Only 0.07 lb. of elemental selenium was deposited at the cathode. No hydrogen selenide was evolved during and throughout the test. The current efficiency of the cell during this test was calculated to be 81.2%, the energy requirement being 0.41 kwh. per pound $H_2SeO_4$.

*Example 2.*—In this test the conditions were the same as in Example 1 with the particular exceptions hereinafter noted. In this test only about 60 pounds of 30% hydrogen peroxide was added to the catholyte during the test. In this test 2.1 pounds of elemental selenium was deposited at the cathode, but no hydrogen selenide was evolved. The current efficiency (calculated) in this test was 80.3%.

*Miscellaneous operating details*

In practical commercial operation it is contemplated that when the oxidation of selenious to selenic acid is complete, the current supplied to the cell will be interrupted and about one-half the anolyte withdrawn from the cell for the recovery of selenic acid therefrom. The anolyte may be replaced or built up to substantially its original concentration (particularly as to selenious acid) as given above by adding either original raw materials as hereinabove set forth or some of the remaining materials left from prior operations. It is contemplated that such prior operations will usually supply a part at least of the anode chamber charge or anolyte for succeeding operations in standard practice.

In preparing the final product (selenic acid) from the anolyte withdrawn from the cell, resort may be had to various processes which form per se no part of the present invention and which are to some extent at least known to the prior art. For example, the aqueous solution of selenic acid, which is the composition of the anolyte at the end of the electrolysis, may be evaporated at atmospheric pressure until the temperature reaches about 140° C. Following this, the liquid may be evaporated under vacuum until the temperature reaches about 175° to 180° C., at which point the acid concentration is well above 90% $H_2SeO_4$. To prepare anhydrous selenic acid, the concentrated acid prepared as aforesaid may be cooled to between 30° and 56° C. and crystals of selenic acid allowed to form therein. The mother liquor may then be decanted or otherwise separated for re-evaporation or for use in forming a part of a succeeding charge for a subsequent electrolysis. A hydrated form of selenic acid may also be obtained by crystallizing under other temperature conditions. Alternatively, salts of selenic acid may be prepared from the anolyte liquid before or after concentration for example by reacting this liquid with suitable carbonates, oxides or hydroxides of a metal, the salt of which is to be prepared.

During the operation of the cell as aforesaid and due to the fact that hydrogen peroxide in aqueous solution is constantly being supplied to the cathode chamber during the electrolysis, the volume of the catholyte is continually being increased. As it is desired to maintain a constant volume of catholyte in the cathode chamber, the excess is permitted to overflow the upper edges of the box-like diaphragm 4 and to pass directly into the anode chamber 5, so as to mix with the anolyte therein. This material thus supplied to the anolyte during the operation will consist essentially of an aqueous solution of selenic acid, with possibly some undecomposed hydrogen peroxide remaining therein. The hydrogen peroxide thus introduced into the anolyte can have no undesired effect upon the materials of which the anolyte is composed as aforesaid, except possibly and to what probably is a minor or negligible extent, to oxidize such materials. This oxidation, however, is a desired action and in fact is the purpose of the entire process. It is believed, however, that oxidation occurring in this way is of a minor and practically negligible amount. It will thus be seen that the anolyte is continually being augmented in volume during the electrolysis. Here again overflow means must be provided in order that the volume of the anolyte remain constant. This is done by providing the overflow pipe 19 or something equivalent thereto. Any anolyte overflowing during the electrolysis may be collected, in accordance with the present invention, and may be used either in its unchanged condition as a part of a charge for the anode compartment of a similar cell for a subsequent electrolysis operation or may have a part or all the selenic acid removed therefrom, or may be used for any other purposes for which it is suitable. Under normal conditions of continuous commercial operation, it is contemplated that this overflow liquid will be used as a part of a charge for the anolyte compartment of a cell for a succeeding operation.

While we have shown and described but one type cell in which the process of the present invention may be carried out, it has been shown wherein this particular apparatus is not per se essential to the process and it has been pointed out wherein factors may be critical or otherwise for the successful performance of the process. We have also described the process both theoretically and practically and in detail and given examples thereof. We do not wish to be limited, therefore, except by the appended claims.

What is claimed is:

1. The process of preparing selenic acid from selenious acid in an electrolytic cell having anode and cathode chambers separated by a porous diaphragm of electrically non-conducting material, and having an anode of material selected from the group consisting of lead, metallic material consisting essentially of lead which behaves under the conditions present in a manner equivalent to lead, carbon, and platinum, and a cathode of material selected from the group consisting of lead, metallic material consisting essentially of lead which behaves under the conditions present in a manner equivalent to lead, carbon, platinum, tin, titanium, zinc and nickel, said process comprising the steps of introducing into the cathode chamber of said cell as a catholyte an aqueous solution of selenic acid having a concentration of $H_2SeO_4$ of about 5% to about 50% by weight, introducing into the anode chamber of the cell as an anolyte an aqueous solution of selenious and selenic acids having a concentration of selenious acid of not over about 25% by weight and a concentration of selenic acid of about 15% to about 25% by weight, passing an electric current through said cell of such value in respect to the surface areas of the cathode and anode as to give an anode current density of about 3 to about 12 amperes per square foot and a cathode current density of about 10 to about 40 amperes per square foot, during the passage of electric current as aforesaid supplying to said cathode chamber an aqueous solution of hydrogen peroxide, so as substantially to prevent the evolution of gaseous hydrogen selenide and to minimize the reduction of selenium at the cathode, and recovering selenic acid from the anolyte following the electrolysis as aforesaid.

2. The process of preparing selenic acid in accordance with claim 1, wherein said anolyte has an initial concentration prior to the electrolysis of about 15% to about 25% by weight selenious acid.

3. The process of preparing selenic acid in accordance with claim 1, wherein said catholyte has a concentration of selenic acid of about 15% to about 35% by weight.

4. The process of preparing selenic acid in accordance with claim 1, wherein the anode current density is about 5 amperes per square foot, and the cathode current density is about 15 amperes per square foot.

5. The process of preparing selenic acid in accordance with claim 1, wherein the aqueous solution of hydrogen peroxide supplied to the cathode chamber has about a 30% concentration of hydrogen peroxide, and comprising the additional steps of maintaining the liquid levels in both said anode and cathode chambers with the level of the catholyte in said cathode chamber above that of the anolyte in said anode chamber, passing liquid overflowing from said cathode chamber to said anode chamber, and collecting liquid overflowing from said anode chamber for recovery of the selenic acid content thereof.

6. The process of preparing selenic acid from selenious acid in an electrolytic cell having anode and cathode chambers separated by a porous Alundum diaphragm and having an anode and a cathode both formed of metallic material consisting essentially of lead and which behaves under the conditions present in a manner equivalent to lead, said process comprising the steps of introducing into the cathode chamber of said cell as a catholyte an aqueous solution of selenic acid having a concentration of about 15% to about 35% by weight selenic acid, introducing into the anode chamber as an anolyte an aqueous solution consisting essentially of selenious and selenic acids having a concentration of selenious acid of about 15% to about 25% by weight and a concentration of selenic acid of about 15% to about 25% by weight, passing an electric current through said cell of such value in respect to the surface areas of the cathode and anode as to give an anode current density of about 5 amperes per square foot and a cathode current density of about 15 amperes per square foot, during the passage of electric current as aforesaid supplying to said cathode chamber a 30% aqueous solution of hydrogen peroxide, so as substantially to prevent the evolution of gaseous hydrogen selenide and to minimize the reduction of selenium at the cathode, maintaining the liquid levels in both said anode and said cathode chambers at predetermined points with the level of the catholyte in said cathode chamber above that of the anolyte, passing liquid overflowing from said cathode chamber directly to said anode chamber, collecting liquid overflowing from said anode chamber, recovering selenic acid from the anolyte, and returning to said anode chamber for a subsequent electrolysis as aforesaid material remaining from the anolyte from which selenic acid has been recovered and collected material overflowing from said anode chamber as aforesaid.

JOHN H. SCHLOEN.
LUIGI V. FRANCHETTO.

REFERENCES CITED

The following references are of record in the file of this patent:

Manuelli et al., Chemical Abstracts, vol. 4 (1910), page 3048.